May 21, 1957 — G. K. THOMPSON — 2,793,276
APPARATUS FOR TREATING DIELECTRIC SUBSTANCES
Filed March 3, 1954 — 2 Sheets-Sheet 1
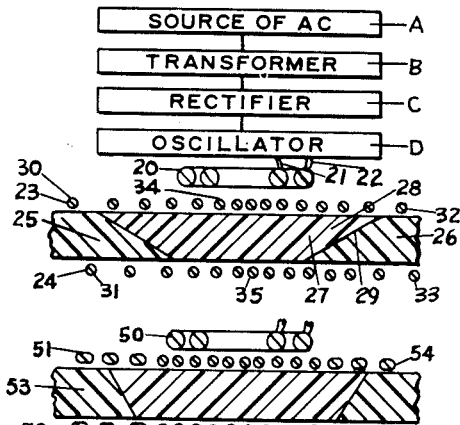
FIG. 1
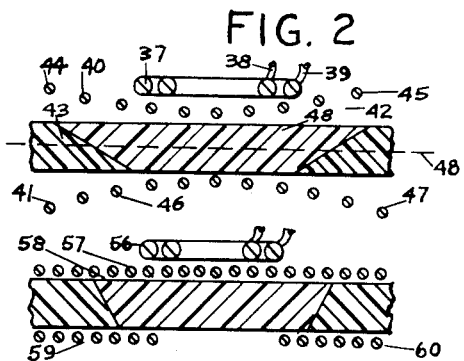
FIG. 2
FIG. 3
FIG. 4
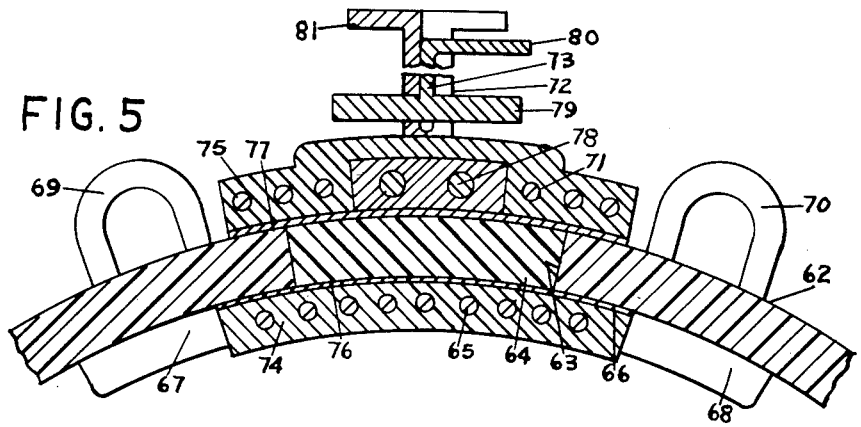
FIG. 5
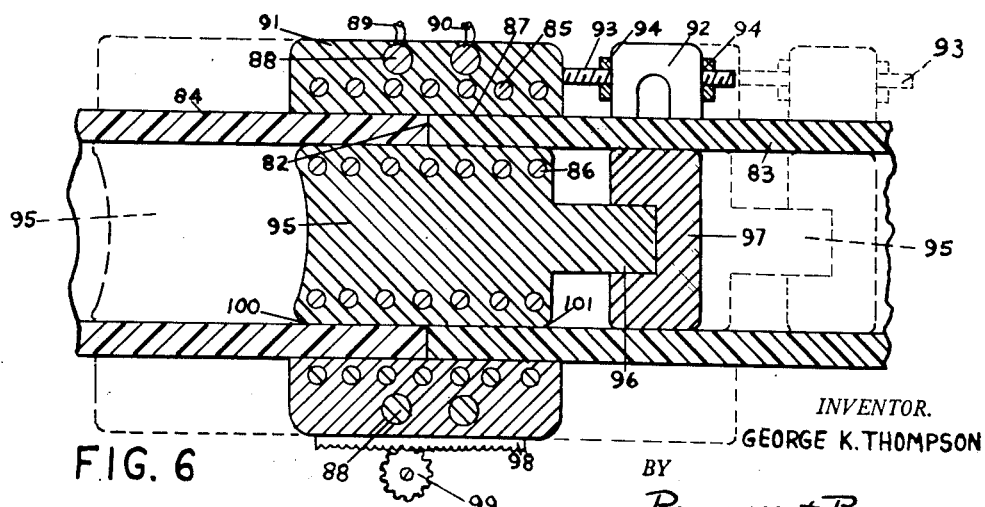
FIG. 6
INVENTOR.
GEORGE K. THOMPSON
BY
Pearson + Pearson
ATTORNEYS

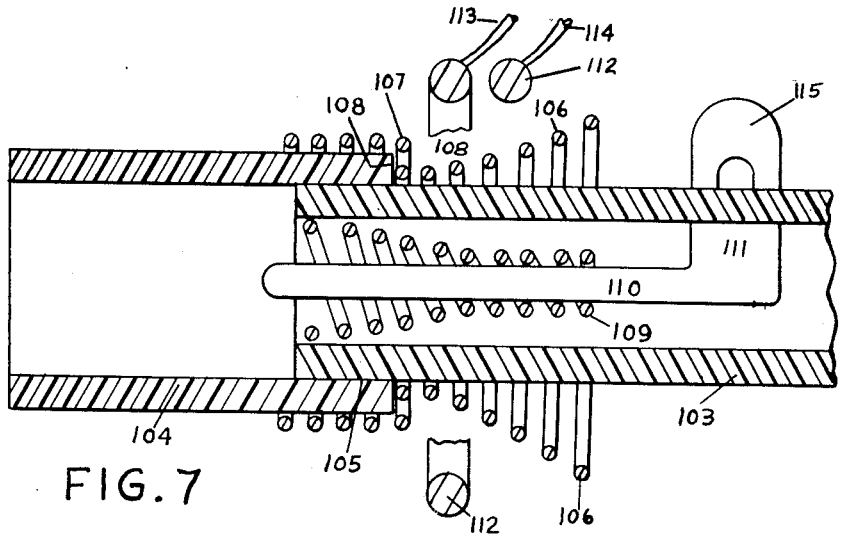
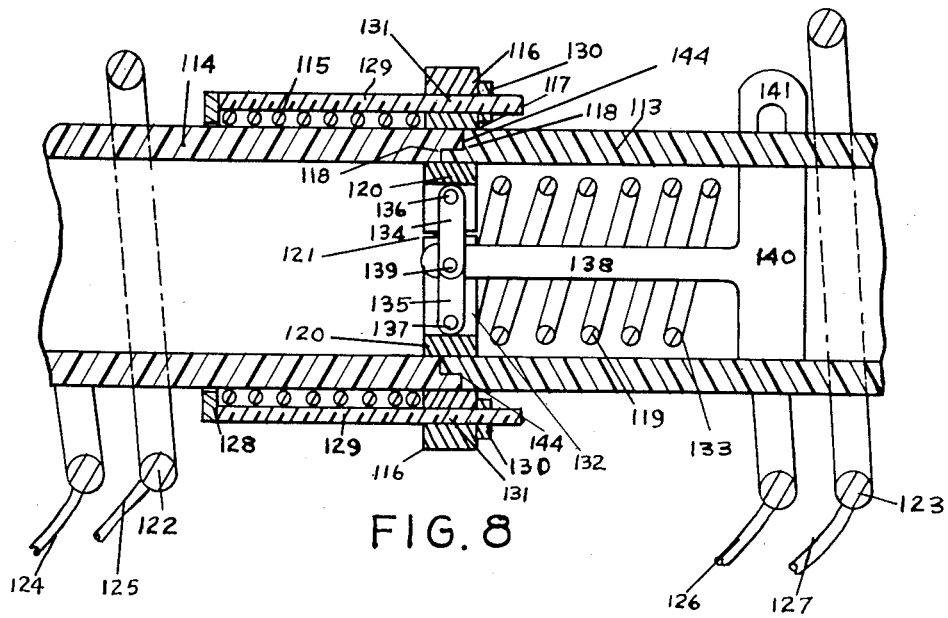

United States Patent Office 2,793,276
Patented May 21, 1957

2,793,276

APPARATUS FOR TREATING DIELECTRIC SUBSTANCES

George K. Thompson, Lovell, Maine, assignor to Plastic Containers, Inc., Biddeford, Maine, a corporation of Maine Application March 3, 1954, Serial No. 413,919

18 Claims. (Cl. 219—10.79)

This invention relates to improved apparatus and methods for treating dielectric substances by subjecting them to the action of an electrostatic field at a high frequency. It is especially useful with substances of sheet-like form having a large area or an awkward physical shape whereby leads to the electrodes would be clumsy to handle and difficult to control.

The subject matter of this application constitutes an improvement over my prior application, Serial No. 307,944, filed September 3, 1952, and entitled "Method and Apparatus for Treating Materials."

In my prior application, I disclosed apparatus for treating materials which included a generator of high frequency current, a conductively isolated coil system consisting of a pair of conductively isolated self resonant inductor coils, each on an opposite side of the substance to be treated and each inductively coupled with the other through the substance, and a coupling coil for inductively coupling the generator with the coil system. I also disclosed helical or spiral inductor coils which conformed to the shape of the substance being treated, inductor coils in which the cross section of the windings was increased at the terminal ends to form capacitor plates and inductor coils in which the number of turns in one of said coils was increased to step up the voltage in the manner of a transformer. Mechanical means such as a gear and gear rack, was also disclosed for traversing the coupling coil along the inductor coils to average or level off the difference in potential between the inductor coils.

One of the objects of this invention is to provide means integral with the inductor coils rather than mechanical means for intensifying or leveling off the differences in potential between opposite inductor coils.

Another object of this invention is to provide magnetic means for holding and moving an inductor coil on the inaccessible side of the surface being treated whereby said coil is automatically positioned opposite the inductor coil on the accessible side thereof.

Still another object of the invention is to provide mechanical means operable from the accessible side of the substance being treated for tuning the coil system to resonance with the frequency of the generator.

A further object of the invention is to provide capacitive loading of varying degrees at each end of the inductor coils together with automatic means for changing the self-capacitance of one of the inductor coils to compensate for the variation in mutual capacitance of the coil system arising from changing dielectric constant and loss factor in the substance as it is progressively treated.

Another object of the invention is to provide apparatus capable of fusing plastic tubes at their lines of abuttment to form, when cooled, a strong weld, said apparatus being easily controllable from the outside of the tubes and not requiring leads or elongated supports within the tube.

Another object of the invention is to provide, within the substance receiving space between the conductively isolated self-resonant coils, an electrostatic field of varying potential gradient so that a substance progressively traversing the space or progressively traversed in the space, will at some instant react with optimum intensity. It is known that non-conductive substances not only react most vigorously to certain critical frequencies, but they also react similarly within certain ranges of potential difference. These optimum reaction points vary, not only with the rising or falling temperature of the substance, but with the percentage of volatile matter existing within the substance at any given instant and also with changes in the chemical structure resulting from heat and molecular agitation.

In the drawings,

Fig. 1 is a diagrammatic view, in section, of one form of improved means for equalizing the intensity of the electrostatic field along zones of a substance receiving space by turn spacing.

Fig. 2 is a fragmentary view similar to Fig. 1 showing another form of such means wherein the turns of the coils are spaced from the substance rather than from each other.

Fig. 3 is a view similar to Fig. 2 showing another form of such means wherein the turns of the coils are of enlarged cross sectional area.

Fig. 4 is a view similar to Fig. 2 showing another form of such means wherein two or more separate inductor coils are positioned on the same side of the substance receiving space.

Fig. 5 is a diagrammatic view in section showing the invention arranged to weld a plug in a sheet, both being of a dielectric substance, a tuning means in the form of a metal slug and magnetic means for supporting the inductor coil on the inaccessible side of the sheet.

Fig. 6 is a diagrammatic view in section showing the invention arranged to butt weld two tubes made of a sheet-like dielectric substance, the coupling coil and work coils all being movable as a unit to traverse the line of weld.

Fig. 7 is a view similar to Fig. 6 showing another type weld on similar tubes with the outer inductor coil stepped, and the entire inner inductor coil movable by magnetic means for positioning the coil from the accessible side of the tubes, and Fig. 8 is a view similar to Fig. 6 showing a stepped weld on similar tubes with the outer coil compressible and decompressible for tuning, the inner coil positioned within the tube by magnetic means, the inner coil having a free end to permit expansion under temperature and both inductor coils having capacitive element at adjacent ends.

As shown in Fig. 1, A represents a source of alternating current, connected to a transformer B which steps up the supply voltage to several thousand volts. Transformer B is connected to a rectifier C which converts the alternating current to direct current and rectifier C is connected to an oscillator D for producing high frequency energy. Oscillator D is conductively connected to a coupling coil 20 by leads such as 21 and 22. It will be understood that the energizing of the coupling coils such as 20 shown in all of the figures of the drawing is the same as that of coil 20 and for that reason the elements A, B, C and D are shown only in Fig. 1. It will also be understood that, in accordance with the teaching of my above mentioned prior application, the work elements of this invention comprise a conductively isolated coil system made up of at least two self resonant, conductively isolated inductor coils having a dielectric substance receiving space therebetween and energized inductively by the coupling coil. There is no electric circuit associated with the coil system and there are no leads to the coils of the coil system. Thus dielectric substances of sheet-like form in various physical shapes especially those having a relatively inaccessible side may be treated between the inductor coils without being encumbered by leads to the coils.

In Fig. 1 a self resonant, conductively isolated flat spiral inductor coil 23 is spaced apart from a self resonant, conductively isolated flat spiral inductor coil 24 to form therebetween a dielectric substance receiving space 25. For illustration purposes a sheet of dielectric substance 26, having a tapered hole 27 is shown there being a tapered plug 28 which is desired to be welded along the circumferential taper 29 to fill the hole 27. If the turns of the flat spiral coils 23 and 24 were uniformly spaced apart, the zone of highest difference of potential would be opposite the adjacent outer turns of the coils and the substance in this outer annular zone would be exposed to more intense heating than the substance opposite the inner turns of the coils. Traversing of the coupling coil would equalize such treatment, as taught in my prior application. However, I have discovered that such traversing may be eliminated and that the treatment effect can be equalized and made more uniform by spacing the turns of the coils progressively more closely to each other from the outside of the coil toward the centre of the coil. Thus depending on the length of the desired zone of treatment and the intensity of treatment desired in such zone, the turns of the coils may be so spaced apart from each other as to provide uniform heating effect in the zone prior to energizing the coil system.

As indicated in Fig. 1 an integral outer portion 30, 31, 32 and 33 of inductor coils 23 and 24 is therefore more widely spaced than the integral inner portions such as 34 and 35 of the coils to level off the intensity of treatment along the gradually tapered line of weld 29.

In Fig. 2 a coupling coil 37 similar to coupling coil 20 and having leads 38 and 39 is inductively coupled to a pair of self resonant, conductively isolated inductor coils 40 and 41. A dielectric substance receiving space 42 is provided between coils 40 and 41 and a substance 43, similar to sheet 26 is positioned therein. Instead of flat spiral coils with the turns non uniformly spaced from each other, I form coils 40 and 41 with a taper so that they assume a concave shape. By gradually tapering the integral portions 44, 45, 46 and 47 of coils 40 and 41 away from the central plane 48 of the space 42, the same levelling off of the treatment effect is secured as in the construction of Fig. 1.

Similarly in the device shown in Fig. 3, wherein the coupling coil is designated 50, the inductor coils 51 and 52 and the substance receiving space 53, the same levelling off is secured by forming an integral portion of each coil with an enlarged cross sectional area as at 54.

In Fig. 4, a coupling coil 56 is shown together with a flat spiral inductor coil 57 on one side of a dielectric substance receiving space 58 and two similar coils 59 and 60 on the opposite side of space 58. Multiple electrostatic fields are thus formed in space 58 and the zones of intensity thereof may be intensified or averaged by the relative positions of coils 59 and 60.

It should be noted that all of the means shown in Figs. 1 to 4 accomplish the equalizing or the intensifying of the electrostatic field in zones of, or in all of, the substance receiving space without requiring traversing of the coupling coil and that all of said means are integral with an inductor coil.

In Fig. 5 the invention is shown applied to a sheet-like dielectric substance such as a plastic airplane canopy 62 in which a hole 63 has been accidentally formed. The hole 63 is first enlarged by a reamer until an arbitrary diameter is reached and then a plug 64 of the same material as canopy 62 is prepared to fit hole 63. A nearly flat spiral coil 65, which is self resonant and conductively isolated, is positioned on the under surface 66 of canopy 62 by means of shoes 67 and 68 of magnetizable metal and magnets 69 and 70 on the upper surface of canopy 62. A second and similar nearly flat inductor coil 71 is affixed to a push rod 72 of insulating material, axially bored to accommodate an internal push rod 73. At least one, and preferably both, of the coils 65 and 71 are embedded in non conductive imperforate material such as ceramic 74 and 75 and the adjacent opposite faces 76 and 77 of the material 74 and 75 is preferably mica covered.

Mounted at the lower end of push rod 72 within the innermost turn of inductor coil 71 and parallel thereto is a flat spiral coupling coil 78 with its terminals connected to leads not shown similar to leads 21 and 22 of coupling coil 20. Above coupling coil 78 and inductor coil 71 and fixed to internal push rod 73 is a disc shaped metal element 79 termed a tuning slug. By means of a handle 80 on push rod 73 the vertical position of element 79 may be varied in respect to its proximity to coupling coil 78 and inductor coil 71, causing a change in natural resonance and tuning the coil system to resonance with the applied frequency. The inductor coils 65 and 71 each consist of from four to six turns to meet the required critical resonant frequency and, as explained above, by suitable turn spacing, size of cross section, or additional coils may be adapted to various physical shapes of the dielectric substance such as 62 to intensify a treatment band or equalize the treatment along one or more zones of the substance receiving space.

When energy is applied inductively to the coil system by coupling coil 78 and the system adjusted to resonance the operator exerts a light downward pressure, or lateral pressure as the case may be on the push rod 72 by its handle 81. Under these conditions, the disc or plug 64 of dielectric material and the canopy 62 also of dielectric material are heated in the area immediately contiguous to the periphery of plug 64 and as a molten state of the material is approached the pressure from above makes the plug and canopy a continuous, homogeneous mass conforming closely to the plane surfaces of the canopy prior to damage. It will be evident that inductor coils 65 and 71 can be formed in flat, concave or convex shape to conform with the shape of the dielectric sheet-like substance to be treated and that in any case the entire coil system can be controlled and operated from the accessible side of such a sheet-like substance. In fact the spiral coils 65 and 71 may be fashioned as cones with rectangular convolutions, instead of curvilinear convolutions, to mate effectively on opposite sides of the corner of boxes or other angular solids and shapes.

In Fig. 6 the invention is shown applied to a sheet-like dielectric substance of tubular shape for the purpose of butt welding one tube such as 83 to a similar tube 84 at the meeting line 82. The coil system provided includes an outer cylindrical helical inductor coil 85 and a coaxial inner cylindrical helical inductor coil 86, each being self resonant, conductively isolated and spaced apart from the other to form an annular dielectric substance receiving space 87. A coupling coil 88, having leads 89 and 90, similar to leads 21 and 22, is imbedded in ceramic 91 or the like to encircle coil 85 and a magnet 92 is adjustably connected thereto by a threaded rod 93 and threaded nuts such as 94. The helical inductor coil 86 is embedded in ceramic 95 or the like and connected at 96 to a shoe 97 of magnetizable metal whereby the position of coil 86 may be adjusted by magnet 92. Instead of coil shaping to intensify the treatment effect of coils 85 and 86 on the line of weld 82, I may provide traversing mechanism such as indicated at 98 and 99 to traverse the coupling coil and the coil system. The tubes 83 and 84 are pressed together with considerable force in any well known manner, the coil system is inductively energized by coupling coil 88 and the coupling coil, as well as the inductor coils, are then traversed from point 100 to point 101 by mechanism 98 and 99. The line of weld 82 thus has twice the amount of heat developed at points 100 and 101 because in each oscillation it is exposed twice, first to the field from the left ends of the coils and then from the field at the right ends of the coils. An effective butt weld is thus achieved at line 82, whereupon the device may be slid along the tubes to weld the next section in a similar manner.

In Fig. 7 the device is shown as it may be applied to welding two tubes of dielectric substance 103 and 104 along a line 105 where the tubes overlap. The tubes 103 and 104 may be one to two inches in diameter and telescoped a distance of about half an inch. An outer helical inductor coil 106, stepped at 107 to conform to the shoulder 108, is positioned outside the telescoped joint with the turns spaced at non uniform distances to equalize the treatment effect along the overlapped portion 105 and to reduce the treatment effect where not needed. An inner helical inductor coil 109 is mounted on a rod 110 carried by a shoe 111 of magnetizable metal and may also have its turns nonuniformly spaced to correspond with the turns of coil 106. Both coils 106 and 109 are self resonant and conductively isolated and form a coil system which may be inductively energized by the coupling coil 112, which in turn is conductively energized through leads 113 and 114 similar to leads 21 and 22. A movable magnet 115 is provided on the outer accessible side of the tubes 103 and 104 for moving the coil 109 into position inside the tubes. Coupling coil 112 may be traversed if desired to also equalize the treatment effect along line of weld 105 thereby assuring that a good weld is secured.

In Fig. 8 a preferred form of the invention is illustrated as it may be applied to the step welding of the ends of a pair of tubes 113 and 114 formed of a sheet-like dielectric substance. A self resonant conductively isolated inductor coil 115 is externally concentric with the tubes 113 and 114 and terminates in an integral section of enlarged surface area such as the split capacitor ring 116. The inner surface 117 of ring 116 is mica coated and straddles the stepped line of weld 118. A self resonant, conductively isolated inductor coil 119 is internally concentric with tubes 113 and 114 and terminates in an integral section of enlarged surface area such as the capacitor ring 120. Ring 120 is split at 121 and is of resilient material whereby it may be installed inside tube 113 opposite the weld line 118 and exert pressure thereagainst. Preferably the outer capacitor ring 116 is also resilient to exert pressure on the outside of tube 114 opposite the weld line 118 or any other suitable means of compressing ring 116 may be used.

Coupling coil 122 is concentrically disposed around inductor coil 115 and a second coupling coil 123 is concentrically disposed around inductor coil 119 but with the tube 113 interposed between. Leads 124, 125, 126 and 127 similar to leads 21 and 22 connect the coupling coils 122 and 123 to a common source of radio frequency energy such as indicated in Fig. 1.

Tuning of the self resonant inductor coils 115 and 119 is accomplished by compressing or expanding inductor coil 115 by means of a movable yoke or ring 128. Ring 128 is movable axially of the coil 115 through push rods such as 129, each slidable in capacitor ring 116 and fixed in various positions by the nuts 130 threaded at 131 to rods 129.

Internal inductor coil 119 is wound with resistive alloy which expands upon heating and is integral with and supported by ring 120 at one end 132 while the opposite end 133 is free to expand or contract. When the coil system made up of coils 115 and 119 has been adjusted to resonance and radio frequency energy applied at the supply frequency, a large potential difference is generated between capacitor elements 116 and 120 causing the dielectric substance in the substance receiving space 144 therebetween to heat. An increase in mutual capacitance between rings 116 and 120 occurs as the substance softens by dielectric heating, which is compensated by the decreased self capacitance of inductor coil 119 which expands with heat along the axis of tube 113.

As the dielectric substance proximate the line of weld 118 and between rings 116 and 120 softens the pressure of rings 116 and 120 coalesces the substance into a homogeneous mass and the step abutment at 118 becomes a continuous, seamless piece of the material integral with the tubes.

A pair of arms 134 and 135 are provided within ring 120, pivoted at 136 and 137 and pivoted to a rod 138 at 139, the rod 138 being carried by a shoe 140 of magnetizable metal. By means of a magnet 141, on the accessible side of tubes 113 and 114, shoe 140 may be moved axially tending to pivot arms 134 and 135 and compress or decompress ring 120 when it is desired to slide the ring 120 into a new or different position.

I claim:

1. Apparatus for treating stationary sheet-like dielectric substances of various physical shapes, said apparatus comprising a generator of high frequency current; a conductively isolated coil system including at least two oppositely disposed, spaced apart inductor coils, each coil being self resonant, conductively isolated, and physically unconnected to the other, said coil system forming a dielectric substance receiving space between and outlined by said oppositely disposed coils, said space conforming substantially to the shape of a dielectric substance to be treated therein; at least one coupling coil conductively energized by said high frequency generator and inductively coupling said generator to said coil system for producing an electrostatic field in said space at the frequency of said generator means, integral with one of the inductor coils for equalizing the intensity of the electrostatic field in zones of said dielectric substance receiving space and variable tuning means associated with said coil system, for establishing and maintaining resonant frequency in said space.

2. Apparatus as specified in claim 1 wherein said means comprises an integral portion of each of said coils having the turns thereof more closely spaced to each other than the turns of another portion of said coil.

3. Apparatus as specified in claim 1 wherein said means comprises an integral portion of each of said coils having the turns thereof at less distance from the central plane of said substance receiving space than the turns of another portion of said coil.

4. Apparatus as specified in claim 1 wherein said means comprises an integral portion of each of said coils having the turns thereof enlarged to a greater cross sectional area than the turns of another portion of said coil.

5. Apparatus as specified in claim 1 wherein said means comprises an entire self resonant, conductively isolated inductor coil forming part of said coil system and positioned at a predetermined distance from another such coil on the same side of said substance receiving space.

6. Apparatus for treating sheet-like substances of various physical shapes, said apparatus comprising a generator of high frequency current; a conductively isolated coil system including at least two oppositely disposed, spaced apart inductor coils, each coil being self resonant, conductively isolated, and physically unconnected to the other, said coil system forming; a dielectric substance receiving space between and outlined by said oppositely disposed coils, said space conforming substantially to the shape of a dielectric substance to be treated therein, and having an accessible side and a relatively inaccessible side; at least one coupling coil conductively energized by said high frequency generator and inductively coupling said generator to said coil system for producing an electrostatic field in said space at the frequency of said generator, and manually operable, variable tuning means including a push member operable from the accessible side of said substance receiving space for tuning said coil system to resonance with the frequency of said generator.

7. A combination as specified in claim 6 wherein said manually operable, variable tuning means includes a metal tuning slug carried by said push member at a spaced distance from an inductor coil on the accessible side of said space and movable toward and away from said coil and space by said push member.

8. A combination as specified in claim 6 wherein said manually operable, variable tuning means includes mechanism cooperable with said push member for compressing and decompressing an inductor coil on the accessible side of said space as said push member is moved.

9. Apparatus for treating sheet-like substances of various physical shapes, said apparatus comprising a generator of high frequency current; a conductively isolated coil system including at least two oppositely disposed, spaced apart inductor coils, each coil being self resonant, conductively isolated, and supported independently of the other, said coil system forming a dielectric substance receiving space between and outlined by said oppositely disposed coils, said space conforming substantially to the shape of a dielectirc substance to be treated therein and having an accessible side and a relatively inaccessible side; at least one coupling coil conductively energized by said high frequency generator and inductively coupling said generator to said coil system for producing an electrostatic field in said space, at the frequency of said generator and automatic self-variable tuning means for changing the self capacitance of an inductor coil on the inaccessible side of said space to compensate for the variation in mutual capacitance of the coil system arising from changing dielectric constant and loss factor in a substance treated in said space.

10. Apparatus as specified in claim 9 wherein said automatic self-variable tuning means comprises an inductor coil, on the inaccessible side of said space, formed of electric resistant material and having one end free to expand and contract according to the temperature of said coil.

11. Apparatus for treating sheet-like dielectric substances having one surface easily accessible and the opposite surface relatively inaccessible, said apparatus comprising a generator of high frequency current; a conductively isolated coil system including at least two oppositely disposed, spaced apart inductor coils, each coil being self resonant, conductively isolated and supported independently of the other, said coil system forming a dielectric substance receiving space between and outlined by said oppositely disposed coils, said space conforming substantially to the shape of a dielectric substance to be treated therein and having an accessible side and a relatively inaccessible side; at least one coupling coil conductively energized by said high frequency generator and inductively coupling said generator to said coil system for producing an electrostatic field in said space; variable tuning means, forming part of said coil system, for controlling the resonance thereof and magnetic inductor coil supporting means for retaining an inductor coil on the inaccessible side of said space in spaced relationship to the inductor coil on the accessible side thereof.

12. A combination as specified in claim 11, wherein said magnetic inductor coil supporting means comprises a magnetizable metal element supporting an inductor coil on the inaccessible side of said space and a magnet, movably mounted, on the opposite accessible side of said space for supporting said magnetizable metal element.

13. Apparatus for heat fusing dielectric substances of generally sheet-like form and having an accessible sheet surface and an opposite relatively inaccessible sheet surface said apparatus comprising a generator of high frequency current, a conductively isolated coil system including at least two oppositely disposed, self resonant, conductively isolated inductor coils having a dielectric substance receiving space therebetween with an accessible side and a relatively inaccessible side; at least one coupling coil conductively energized by said high frequency generator and inductively coupling said generator to said coil system for producing an electrostatic field in said space at the frequency of said generator, magnetic means for supporting the inductor coil on the inaccessible side of said space; automatic means for stabilizing the frequency of the inductor coil on the inaccessible side of said space; manual means operable on the inductor coil on the accessible side of said space for adjusting the frequency of said coil system and means integral with one of said inductor coils for adjusting the intensity of the electrostatic field in said space.

14. Apparatus for treating stationary sheet-like dielectric substances of various physical shapes, said apparatus comprising a generator of high frequency current; a conductively isolated coil system including at least two oppositely disposed, spaced apart inductor coils, each coil being self resonant, conductively isolated, and physically unconnected to the other, said coil system forming a dielectric substance receiving space between and outlined by said oppositely disposed coils and said space conforming substantially to the shape of a dielectric substance to be treated therein; at least one coupling coil conductively energized by said high frequency generator and inductively coupling said generator to the entire coil system for producing an electrostatic field in said space at the frequency of said generator, magnetic means on one side of said space for supporting a coil of said system on the opposite side of said space and variable tuning means, associated with said coil system, for establishing and maintaining the resonance of said coil system at the resonance of the supply frequency of said generator.

15. A combination as specified in claim 14 wherein said variable tuning means is manually operable and includes a metal tuning slug movably mounted with relation to a coil of said system for advancement and retraction therefrom for tuning said coil system to resonance.

16. A combination as specified in claim 14 wherein said variable tuning means is manually operable and includes mechanism associated with one of the coils of said system adapted to expand and contract said coil for tuning said coil system to resonance.

17. A combination as specified in claim 14 wherein said variable tuning means is automatically operable and includes a coil in said system formed of material having a predetermined resistance and shaped to have a predetermined self capacitance, said coil being free to expand under heat to progressively decrease its self capacitance and thereby maintain said coil system in resonance.

18. A combination as specified in claim 14 wherein said magnetic means for supporting a coil of said system includes mechanism operable from one side of said space for applying pressure, from the other side of said space, on a dielectric substance located in said space.

References Cited in the file of this patent

UNITED STATES PATENTS

| | | |
|---|---|---|
| 2,494,716 | McMahon et al. | Jan. 17, 1950 |
| 2,542,702 | Prow | Feb. 20, 1951 |
| 2,556,236 | Strickland | June 12, 1951 |
| 2,660,660 | Von Hauteville | Nov. 24, 1953 |